United States Patent
Segall

(10) Patent No.: US 8,600,188 B2
(45) Date of Patent: Dec. 3, 2013

(54) METHODS AND SYSTEMS FOR NOISE REDUCTION AND IMAGE ENHANCEMENT

(75) Inventor: Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 388 days.

(21) Appl. No.: 12/882,865

(22) Filed: Sep. 15, 2010

(65) Prior Publication Data
US 2012/0062797 A1 Mar. 15, 2012

(51) Int. Cl.
G06K 9/40 (2006.01)
H04N 5/217 (2011.01)

(52) U.S. Cl.
USPC .......................................... 382/260; 348/606

(58) Field of Classification Search
USPC ................. 382/260–266, 254, 232, 233, 275; 348/606, 607, 618, 622, 623, 625, 627
See application file for complete search history.

(56) References Cited

U.S. PATENT DOCUMENTS

| | | | |
|---|---|---|---|
| 4,463,381 A | 7/1984 | Powell et al. | |
| 5,021,891 A | 6/1991 | Lee | |
| 5,081,692 A | 1/1992 | Kwon et al. | |
| 5,224,062 A | 6/1993 | McMillan, Jr. et al. | |
| 5,282,030 A | 1/1994 | Nishimura et al. | |
| 5,802,481 A | 9/1998 | Prieto | |
| 5,822,011 A | 10/1998 | Rumreich | |
| 5,825,936 A | 10/1998 | Clarke et al. | |
| 5,847,714 A | 12/1998 | Naqvi et al. | |
| 5,974,181 A | 10/1999 | Prieto | |
| 6,055,340 A | 4/2000 | Nagao | |
| 6,289,133 B1 | 9/2001 | Oshino | |
| 6,342,925 B1 | 1/2002 | Akhavan et al. | |
| 6,343,158 B1 | 1/2002 | Shiohara | |
| 6,466,624 B1 | 10/2002 | Fogg | |
| 6,636,645 B1 | 10/2003 | Yu et al. | |
| 6,810,086 B1 | 10/2004 | Puri et al. | |

(Continued)

FOREIGN PATENT DOCUMENTS

| | | | |
|---|---|---|---|
| EP | 2216988 A1 | 8/2010 |
| JP | 10/243238 A | 9/1998 |

(Continued)

OTHER PUBLICATIONS

Yuki Ishii, "Fresh Eyes—Introduction of Video Research Laboratory," The Journal of Institute of Image Information and Television Engineers, Jan. 1, 2008, pp. 52-54, vol. 62, No. 1.

(Continued)

Primary Examiner — Yon Couso
(74) Attorney, Agent, or Firm — Kristine Elizabeth Matthews; David C. Ripma

(57) ABSTRACT

Aspects of the present invention are related to systems and methods for image enhancement, wherein an input image may be separated into two images: a first image comprising image content, from the input image, which may be sharpened; and a second image comprising image content, from the input image, which may be attenuated. One aspect of the present invention relates to determining a noise estimate associated with the input image and using the noise estimate to control the separation of the input image into the two images. Another aspect of the present invention relates to controlling the image separation based on the level of sharpening being applied to the first image.

23 Claims, 17 Drawing Sheets

(56) References Cited

U.S. PATENT DOCUMENTS

| | | | |
|---|---|---|---|
| 6,944,321 | B2 | 9/2005 | Hamid |
| 6,957,147 | B2 | 10/2005 | Baliguet et al. |
| 6,990,252 | B2 | 1/2006 | Shekter |
| 7,046,307 | B1 | 5/2006 | Hui |
| 7,119,852 | B1 | 10/2006 | Vandeginste |
| 7,139,035 | B2 | 11/2006 | Kempf |
| 7,206,459 | B2 | 4/2007 | Berkner et al. |
| 7,266,246 | B2 | 9/2007 | Shaked et al. |
| 7,454,053 | B2 | 11/2008 | Bryll et al. |
| 7,570,831 | B2 | 8/2009 | Shaked et al. |
| 7,599,570 | B2 * | 10/2009 | Berkner ............... 382/265 |
| 7,899,263 | B2 | 3/2011 | Li et al. |
| 8,144,253 | B2 * | 3/2012 | Su et al. ............... 348/607 |
| 2001/0038716 | A1 | 11/2001 | Tsuchiya et al. |
| 2002/0034337 | A1 | 3/2002 | Shekter |
| 2003/0086623 | A1 | 5/2003 | Berkner et al. |
| 2003/0223597 | A1 | 12/2003 | Puria et al. |
| 2004/0013310 | A1 | 1/2004 | Suino et al. |
| 2004/0037466 | A1 | 2/2004 | Gewaltig et al. |
| 2004/0169873 | A1 | 9/2004 | Nagarajan |
| 2005/0244061 | A1 | 11/2005 | Shaked et al. |
| 2005/0276515 | A1 | 12/2005 | Shekter |
| 2006/0093205 | A1 | 5/2006 | Bryll et al. |
| 2006/0103892 | A1 | 5/2006 | Schulze et al. |
| 2006/0140268 | A1 | 6/2006 | Ha et al. |
| 2006/0171466 | A1 | 8/2006 | Schoner et al. |
| 2006/0171473 | A1 | 8/2006 | Schoner |
| 2007/0160304 | A1 | 7/2007 | Berkner et al. |
| 2007/0201759 | A1 | 8/2007 | Lee et al. |
| 2007/0223835 | A1 | 9/2007 | Yamada et al. |
| 2007/0237241 | A1 | 10/2007 | Ha et al. |
| 2007/0242896 | A1 | 10/2007 | Okumichi et al. |
| 2007/0280552 | A1 | 12/2007 | Lee et al. |
| 2008/0013847 | A1 | 1/2008 | Li |
| 2008/0037044 | A1 | 2/2008 | Tse et al. |
| 2008/0095466 | A1 | 4/2008 | Kinrot et al. |
| 2008/0174699 | A1 | 7/2008 | Suzuki et al. |
| 2008/0247664 | A1 | 10/2008 | Lee et al. |
| 2009/0079855 | A1 | 3/2009 | Ito et al. |
| 2009/0214133 | A1 | 8/2009 | Aoyama |
| 2009/0245679 | A1 | 10/2009 | Ohwaki et al. |
| 2009/0324066 | A1 | 12/2009 | Saito et al. |
| 2010/0074548 | A1 * | 3/2010 | Pan et al. ............... 382/260 |
| 2010/0202262 | A1 | 8/2010 | Adams et al. |
| 2010/0220222 | A1 | 9/2010 | Naito |
| 2012/0062797 | A1 | 3/2012 | Segall |
| 2012/0281758 | A1 | 11/2012 | Orlick et al. |

FOREIGN PATENT DOCUMENTS

| | | | |
|---|---|---|---|
| JP | 2001-094832 A | 4/2001 |
| JP | 2002/033941 A | 1/2002 |
| JP | 2002/077914 A | 3/2002 |
| JP | 2003/209716 A | 7/2003 |
| JP | 2003/348379 A | 12/2003 |
| JP | 2004/140759 A | 5/2004 |
| JP | 04/266757 A | 9/2004 |
| JP | 2006/094420 A | 4/2006 |
| JP | 2006-128744 A | 5/2006 |
| JP | 2006/180268 A | 7/2006 |
| JP | 06/317406 A | 11/2006 |
| JP | 07/317109 A | 12/2007 |
| JP | 08/042407 A | 2/2008 |
| JP | 08/123349 A | 5/2008 |
| JP | 2008-107893 A | 5/2008 |
| JP | 08/141658 A | 6/2008 |
| JP | 2009-266233 A | 11/2009 |
| JP | 2010-273168 A | 12/2010 |

OTHER PUBLICATIONS

C. Tomasi and R. Manduchi, "Bilateral Filtering for Gray and Color Images," Proceedings of the 1998 IEEE International Conference on Computer Vision, Jan. 1998, pp. 839-846.

Pietro Perona and Jitendra Malik, "Scale-Space and Edge Detection Using Anisotropic Diffusion," IEEE Transactions on Pattern Analysis and Machine Intelligence, Jul. 1990, pp. 629-639, vol. 12, No. 7.

USPTO Notice of Allowance—U.S. Appl. No. 12/892,816—Mailing Date Oct. 5, 2011.

International Search Report—International Application No. PCT/JP2011/055567—Mailing Date Jun. 7, 2011.

International Search Report—International Application No. PCT/JP2011/055870—Mailing Date Jun. 7, 2011.

International Search Report—International Application No. PCT/JP2011/071167—Mailing Date Dec. 6, 2011.

International Search Report—International Application No. PCT/JP2011/054679—Mailing Date Apr. 12, 2011.

USPTO Notice of Allowance—U.S. Appl. No. 12/892,816—Mailing Date Dec. 29, 2011.

Choi and Kim, "Blocking-Artifact Reduction in Block-Coded Images Using Wavelet-Based Subband Decomposition," IEEE Transaction on Circuits and Systems for Video Technology, vol. 10, No. 5, Aug. 2000.

Sezan et al., Temporally Adaptive Filtering of Noisy Image Sequences Using A Robust Motion Estimation Algorithm, In Proceedings of the International Conference on Acoustics, Speech, Signal Processing, vol. 91, 1991, pp. 2429-2432.

Purushothaman et al., "Compression Block Artifact Reduction in Low Bit Rate Images and Videos," European Journal of Scientific Research, ISSN 1450-216X, vol. 64, No. 2, 2011, pp. 244-253.

Ozkan et al., "Adaptive Motion-Compensated Filtering of Noisy Image Sequences," IEEE transactions on Circuits and Systems for Video Technology, vol. 3, No. 4, Aug. 1993.

USPTO Office Action—U.S. Appl. No. 12/892,803—Mailing Date Oct. 12, 2012.

USPTO Office Action—U.S. Appl. No. 13/434,717—Notification Date Jan. 24, 2013.

USPTO Notice of Allowance—U.S. Appl. No. 12/892,803—Date Mailed: Mar. 26, 2013.

International Search Report—International Application No. PCT/JP2013/000210—Mailing Date Feb. 26, 2013.

USPTO Notice of Allowance—U.S. Appl. No. 12/882,763—Date Mailed: Jul. 17, 2013.

USPTO Notice of Allowance—U.S. Appl. No. 13/434,717—Date Mailed: May 14, 2013.

* cited by examiner

METHODS AND SYSTEMS FOR NOISE REDUCTION AND IMAGE ENHANCEMENT

FIELD OF THE INVENTION

The present invention relates to image and video processing and, in particular, to methods and systems for noise reduction and image enhancement in an image or a video sequence.

BACKGROUND

The quality of a video sequence or of an image may vary widely depending on the source. For example, computer-generated content may be of the highest quality. Packaged media content, for example, Blu-ray media, may be of relatively high quality. Over-the-air high-definition (HD) broadcast content may be of relatively intermediate quality, while content distributed via cable and satellite, may be of a relatively lower quality. Internet protocol television (IPTV) and streamed content may be of relatively low quality. Methods and systems for video and image enhancement that automatically adapt to image- or video-content quality may be desirable.

SUMMARY

Some embodiments of the present invention comprise methods and systems for noise reduction and image enhancement in an input image or a video sequence.

According to a first aspect of the present invention, an edge-preserving filter, for generating, from an input image, a first image comprising image content to sharpen and a second image comprising image content to attenuate, may be controlled based on a noise estimate associated with the input image. In some of these embodiments, a parameter value associated with the edge-preserving filter may be proportional to the noise estimate. In some embodiments, the edge-preserving filter may comprise a bi-lateral filter.

In some embodiments of the present invention, the noise estimate may be based on a first noise estimate associated with, at least one of, the sensor, thermal and grain noise in the input image and a second noise estimate associated with the compression noise in the input image. In some embodiments, the compression noise in the input image may be determined from coding parameters associated with the codec (coder/decoder) by which the image was compressed. In alternative embodiments, the compression noise in the input image may be determined from the image data.

According to a second aspect of the present invention, an edge-preserving filter, for generating, from an input image, a first image comprising image content to sharpen and a second image comprising image content to attenuate, may be controlled based on a noise estimate associated with the input image and a level of sharpening. In some embodiments, the edge-preserving filter may comprise a bi-lateral filter.

In some embodiments of the present invention, the noise estimate may be adjusted to account for the level of sharpening. In some of these embodiments, the level of sharpening may be associated with an alpha parameter associated with an un-sharp masking filter.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 23:
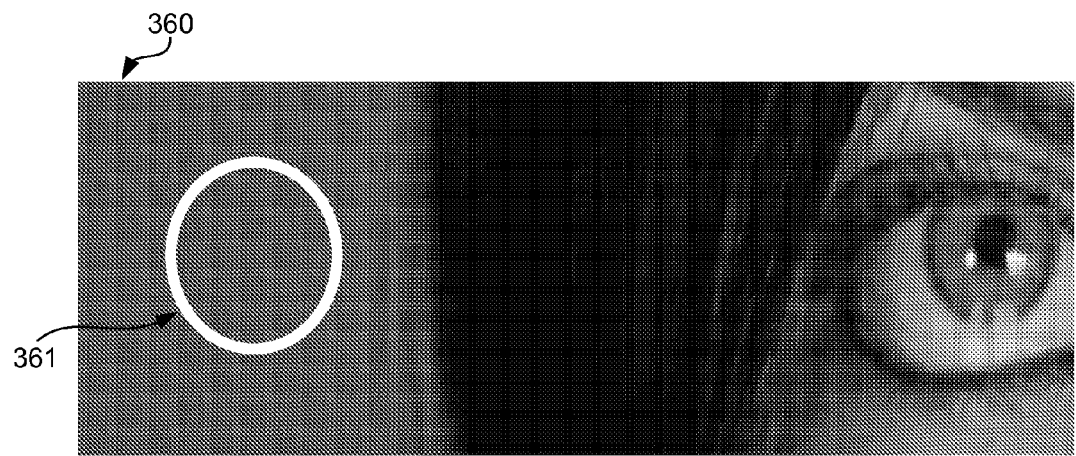
FIG. 23 shows an exemplary, original image.
Figure 24:
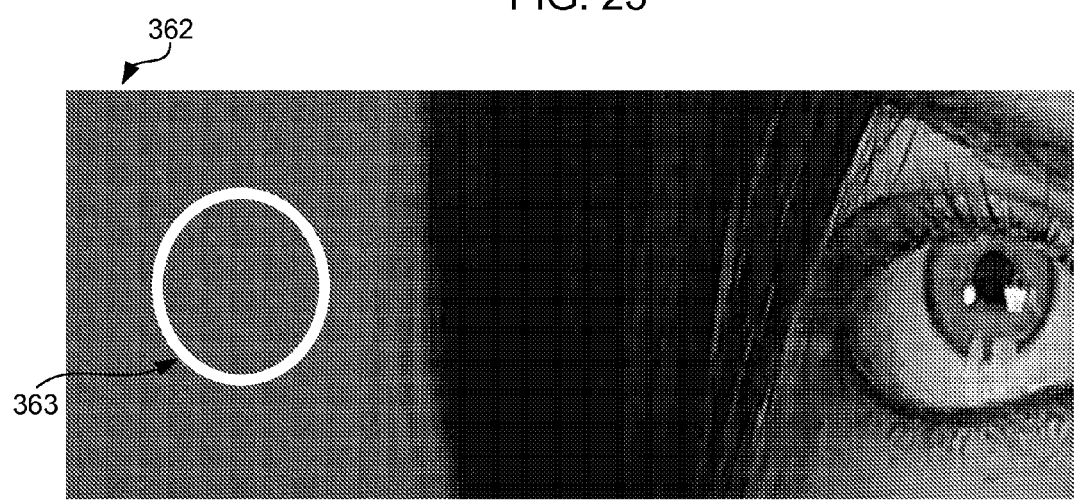
Figure 25:

FIG. 24 shows a result of bi-lateral filtering, according to embodiments of the present invention, of the original image shown in FIG. 23, where the bi-lateral filter parameter value was set based on noise estimated from the original image; and FIG. 25 shows a result of bi-lateral filtering, according to embodiments of the present invention, of the original image shown in FIG. 23, where the bi-lateral filter parameter value was set based on noise estimated from the original image and the level of sharpening.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

The quality of a video sequence or of an image may vary widely depending on the source. For example, computer-generated content may be of the highest quality, packaged media content, for example, Blu-ray media, may be of relatively high quality, over-the-air high-definition (HD) broadcast content may be of relatively intermediate quality, while content distributed via cable and satellite, may be of a relatively lower quality and Internet protocol television (IPTV) and streamed content may be of relatively low quality. Methods and systems for video and image enhancement that automatically adapt to image- or video-content quality may be desirable.

When there is little, or no, noise in an image, either a still image or a frame in a video sequence, the image may be sharpened aggressively, and small details in the image may not be attenuated. However, selective image sharpening may be required in the presence of noise. Stronger and larger-scale features, as defined relative to the degree of noise, may be identified and enhanced, while less significant and smaller-scale features may be unprocessed, or potentially attenuated to mitigate the noise present in the image.

U.S. patent application Ser. No. 12/228,774, entitled "Image Sharpening Technique," filed Aug. 15, 2008, which is hereby incorporated by reference herein in its entirety, describes a technique for image sharpening wherein two image channels are generated from an image: a first channel which may include primarily texture information and a second channel which may include primarily edge and flat-region information. The first channel may be filtered to attenuate higher frequency content of the image in the first channel, and the second channel may be filtered to sharpen the image in the second channel. The filtered first channel and the filtered second channel may be combined to form an enhanced image associated with the input image.

In some embodiments of the present invention, an edge-preserving filter may be used to separate an input image into two channels: a first channel which may comprise image content to be sharpened; and a second channel which may comprise image content to attenuate. In some embodiments of the present invention, the edge-preserving filter may comprise a bi-lateral filter. In alternative embodiments, another edge-preserving filter may be used to perform the separation. In some embodiments, the assignment of the input-image content to the first channel and the second channel may be controlled by a parameter of the edge-preserving filter. For example, a range sigma parameter of a bi-lateral filter may control the assignment of input-image content to the first channel and the second channel in embodiments wherein the edge-preserving filter comprises a bi-lateral filter. In some embodiments, in order to maximize the amount of sharpening, the filter parameter value, for example, the range sigma parameter value in a bi-lateral filter, may be set based on noise statistics associated with the input image.

Figure 1:
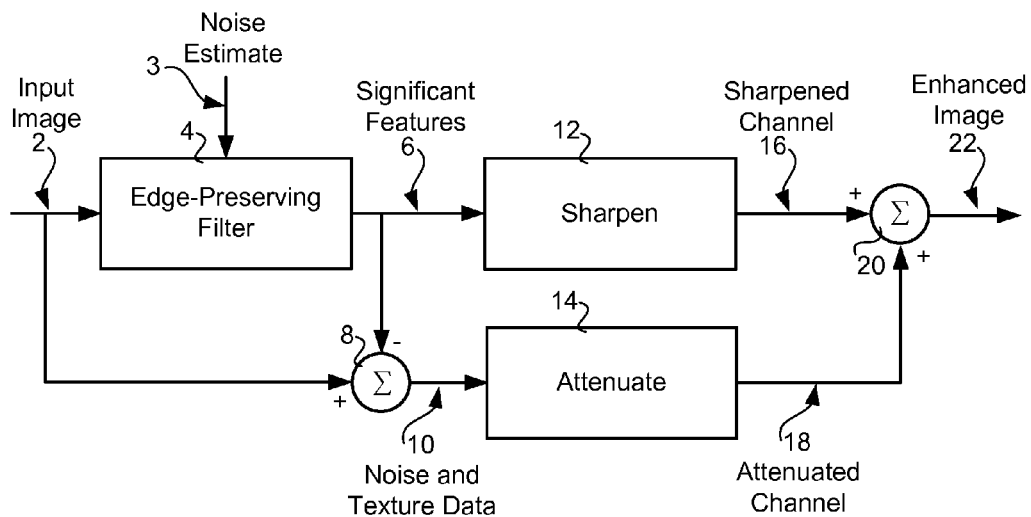
FIG. 1 is a chart showing exemplary embodiments of the present invention comprising controlling the image separation effectuated by an edge-preserving filter using an estimate of the noise in the input image.

Some embodiments of the present invention may be understood in relation to FIG. 1. An input image 2 and a noise estimate 3 associated with the input image 2 may be made available to an edge-preserving filter 4. In some embodiments of the present invention, the edge-preserving filter may comprise a bi-lateral filter. In alternative embodiments, another edge-preserving filter may be used to perform the separation. The edge-preserving filter 4 may be used to divide the input image 2 into two channels 6, 10. A first channel 6 may correspond to significant features in the input image 2, and the second channel 10, formed by removing 8 the first channel 6 from the input image 2, may contain the residual difference between the first channel 6 and the input image 2. The residual difference may comprise noise and texture data. The first channel 6 may be sharpened 12, and the second channel 10 may be attenuated 14. The sharpened channel 16 and the attenuated channel 18 may be combined 20 to form an enhanced image 22. The value of the filter parameter of the edge-preserving filter 4 may control the assignment of input-image content to the first channel 6 and the second channel 10. The value of the filter parameter of the edge-preserving filter 4 may be based on the noise estimate 3. In some embodiments of the present invention, the value of the filter parameter may be proportional to the noise estimate 3. However, the value of the filter parameter may not be equal to zero. In some embodiments, when the noise estimate 3 indicates that the filter parameter should be set to zero, a small, pre-determined value may be assigned to the filter parameter. In alternative embodiments, when the noise estimate 3 indicates that the filter parameter should be set to zero, the edge-preserving filter 4 may pass the input image 2 directly through as the first channel 6, thereby effectuating only sharpened data. In some embodiments of the present invention (not shown), the enhanced image 22 may be up-sampled to a resolution greater than that of the input image 2.

Multiple noise processes may appear in an image or video sequence. At one extreme, an original image may be of very high quality, for example, computer generated imagery. However, other images, or video sequences, may be of lower quality, for example, a sequence or image may be corrupted, during the acquisition process by thermal, sensor, or other noise. In some situations, film grain, or other analog noise, may corrupt an image or video sequence. Furthermore, compression artifacts may corrupt an image or video sequence. The degree of compression artifacts may be related to the bit-rate associated with a video sequence or image. Exemplary bit-rates and quality levels may be high quality Blu-ray discs compressed at approximately 40 Mbps (Mega bits per second), lower quality over-the-air transmissions compressed at approximately 20 Mbps, further lower quality trans-coded cable transmissions compressed at approximately 12 Mbps and lowest quality satellite and IPTV services compressed at less than 10 Mbps.

Figure 2:
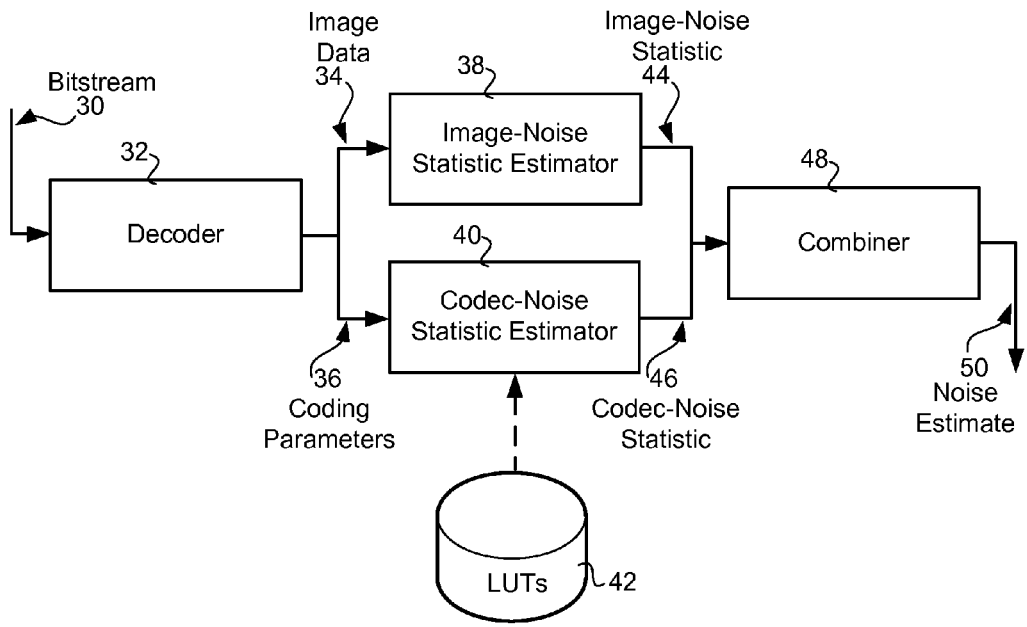
FIG. 2 is a chart showing exemplary embodiments of the present invention comprising estimation of compression noise by accessing a look-up table.

In some embodiments of the present invention described in relation to FIG. 2, an input bitstream 30, associated with a still image or a video sequence, may be decoded by an appropriate decoder 32. The image data 34 may be made available, to an image-noise statistic estimator 38, from the decoder 32, and the decoded coding parameters 36 may be made available, to a codec (coder/decoder)—noise statistic estimator 40, from the decoder 32. In alternative embodiments, the coding parameters 36 may be made available to the codec-noise statistic estimator 40 through meta-data or other external means.

The image-noise statistic estimator 38 may analyze the image data 34 to determine the amount of thermal, sensor, grain, or other image noise present in the image data 34. Many existing methods are known in the art for estimating the image noise present in image data. In an exemplary embodiment of the present invention, the image-noise statistic estimator 38 may identify one, or more, substantially smooth regions in the image data 34 and may calculate the standard deviation of the pixel values within each region. The maximum standard deviation value may be associated with the image-noise statistic 44.

The codec-noise statistic estimator 40 may receive coding parameters 36 associated with the input bitstream 30. In some embodiments, the coding parameters 36 may comprise the quantization interval used for coding the current slice or frame in a video sequence. In alternative embodiments, the coding parameters 36 may comprise the number of bits used to represent the source data. The coding parameters 36 may be used in a look-up operation to determine the amount of noise due to compression. In some embodiments of the present invention, the codec type may be used to select a look-up table from multiple, pre-computed look-up tables 42. The coding parameters 36 may be used as an index into the selected table, and the output may be a measure of the image noise due to compression 46. The measurement provided by the look-up tables 42 may be normalized, either at the time the look-up tables 42 are created or in a post-processing operation (not shown) to have the same units of measurement as the noise estimate 44 provided by the image-noise statistic estimator 38.

In some embodiments of the present invention, a look-up table 42 may be constructed by selecting multiple images and video sequences that are representative of input data. The images and videos sequences may be compressed using a variety of codecs and codec settings, and each result may be subsequently decoded. The decoded results may be compared to the original data, and the noise due to the compression system may be computed, for example. the standard deviation of the error. This computation may be performed over all images and video sequences that are compressed using the same codec and parameter settings, and the result may be stored in the look-up table as the noise statistic for the combination of codec and codec parameter settings. In some embodiments, if additional values are needed, the test image and video sequence data may be compressed with the desired configuration settings. In alternative embodiments, noise statistics may be interpolated from values with a similar compression configuration.

The image-noise statistic 44 and the codec-noise statistic 46 may be combined by a combiner 48 to produce a final noise estimate 50, which may be made available to the edge-preserving filter to control the filter parameter. In one embodiment of the present invention, the maximum of the image-noise statistic 44 and the codec-noise statistic 46 may be assigned to the noise estimate 50. Alternative fusion methods for combining 48 the image-noise statistic 44 and the codec-noise statistic 46 may be used to produce a final noise estimate 50 which may be made available to the edge-preserving filter, and the value of the filter parameter of the edge-preserving filter may be based on the noise estimate. In some embodiments of the present invention, the value of the filter parameter may be proportional to the noise estimate.

Figure 3:
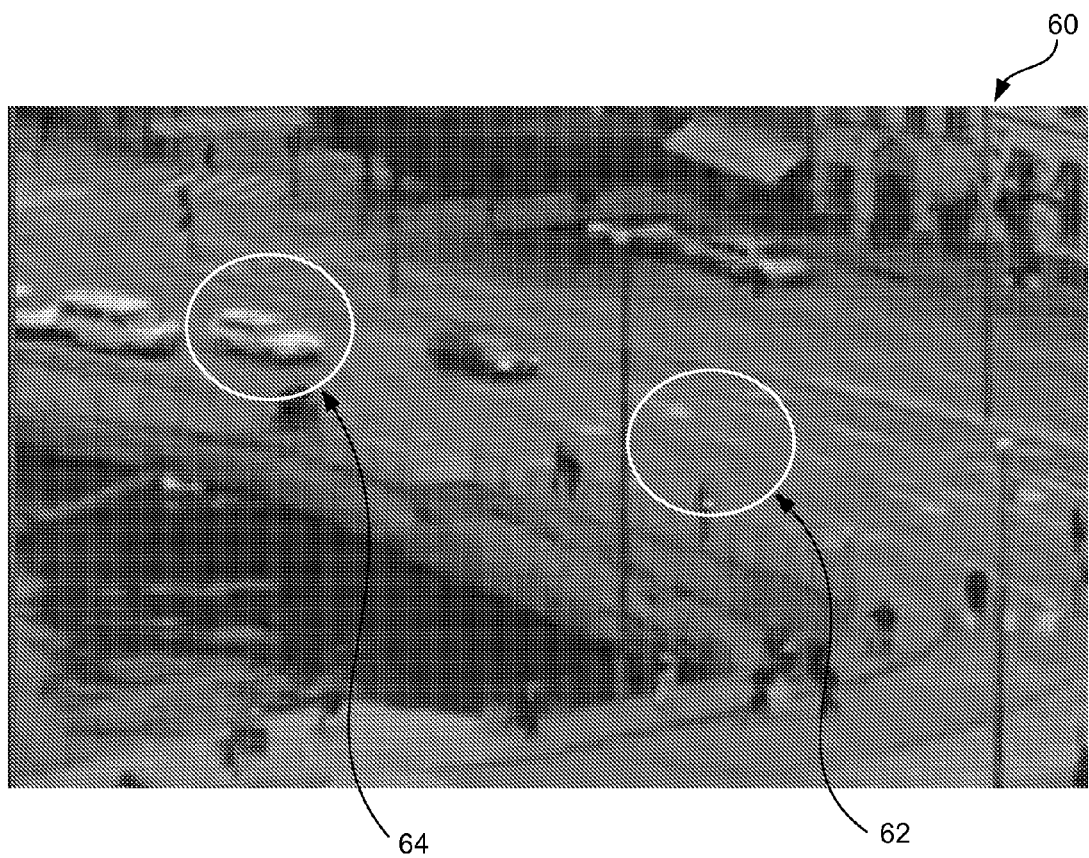
FIG. 3 is an exemplary, original, decoded image frame.
Figure 4:
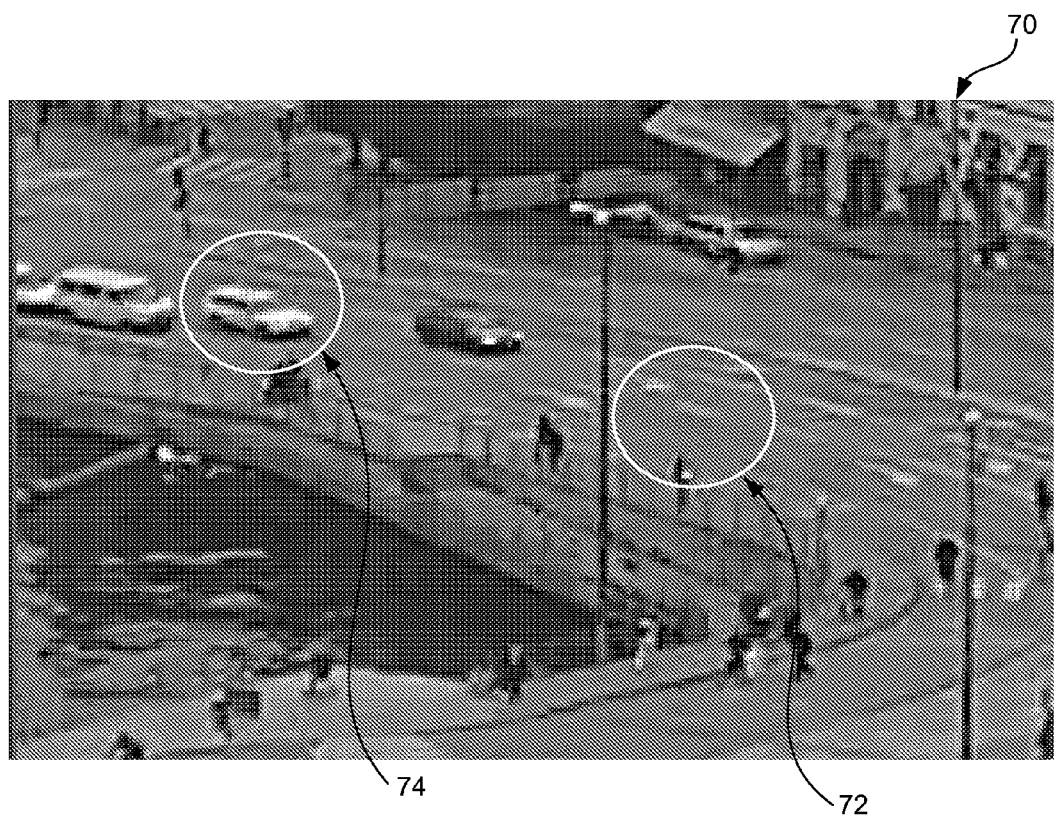
FIG. 4 is an enhanced image resulting from processing, according to embodiments of the present invention, of the exemplary, original, decoded image frame shown in FIG. 3, wherein the noise estimate used to control the bi-lateral filter parameter value was based only on sensor, thermal and grain noise.
Figure 5:
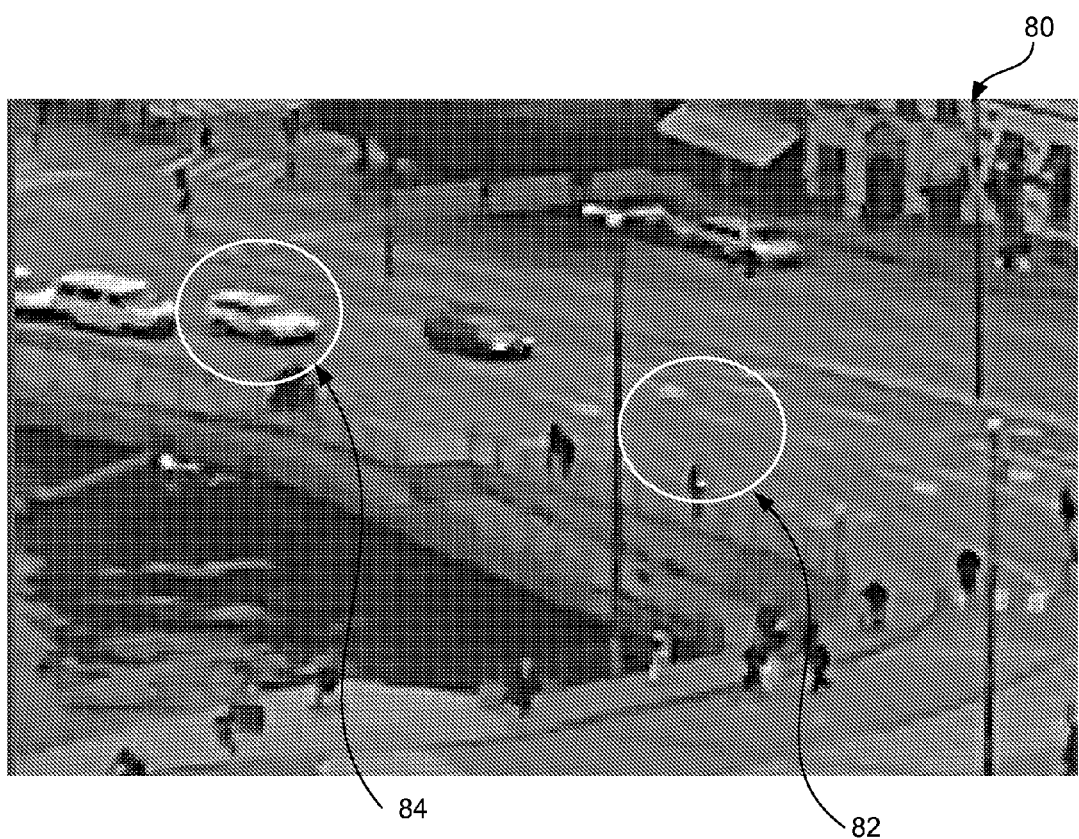
FIG. 5 is an enhanced image resulting from processing, according to embodiments of the present invention, of the exemplary, original, decoded image frame shown in FIG. 3, wherein the noise estimate used to control the bi-lateral filter parameter value was based on sensor, thermal and grain noise and compression noise.

The effectiveness of some embodiments of the present invention may be illustrated in FIGS. 3-8. FIG. 3 depicts an exemplary, original, decoded image 60 with two regions 62, 64 that exhibit coding artifacts shown inside two white circles superimposed on the image 60. One region 62 is along the road, and another region 64 is around a car. FIG. 4 shows an enhancement 70 of the decoded image 60 shown in FIG. 3. The enhanced image 70 was generated using a bi-lateral filter using only an estimate of the image noise to select the range sigma parameter value of the bi-lateral filter. The coding artifacts are visibly enhanced, for example, the regions 72, 74 that are shown in the two superimposed, white circles. However, the enhanced image 80 shown in FIG. 5, by contrast, was enhanced according to embodiments of the present invention wherein a noise estimate accounting for both the image noise, for example, sensor, thermal, grain and other image noise, and the compression noise in the image frame was used to select the range sigma parameter value of the bi-lateral filter. Using this noise estimate produces an enhanced image 80, but without amplifying the coding artifacts, for example, again examine the regions 82, 84 inside the superimposed, white circles.

Figure 6:
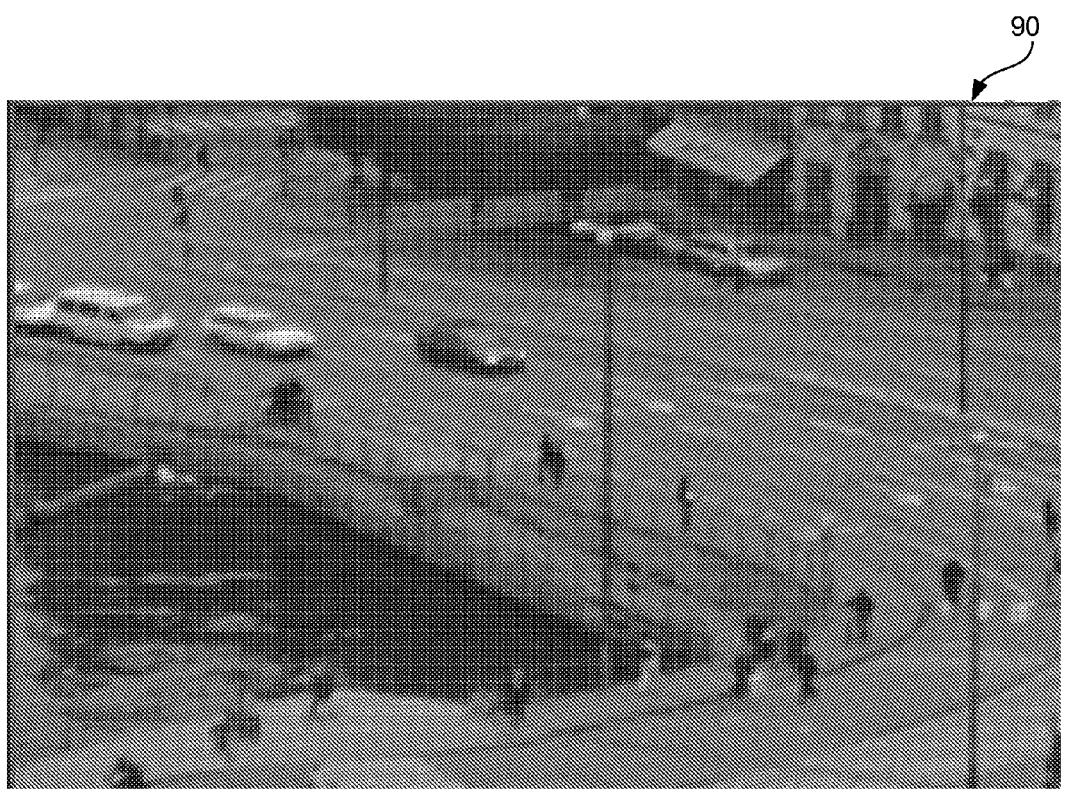
FIG. 6 is an exemplary, original, decoded image frame associated with a lightly compressed image.
Figure 7:
FIG. 7 is an enhanced image resulting from processing, according to embodiments of the present invention, of the exemplary, original decoded image frame shown in FIG. 6, wherein the noise estimate used to control the bi-lateral filter parameter value was based only on compression noise.
Figure 8:
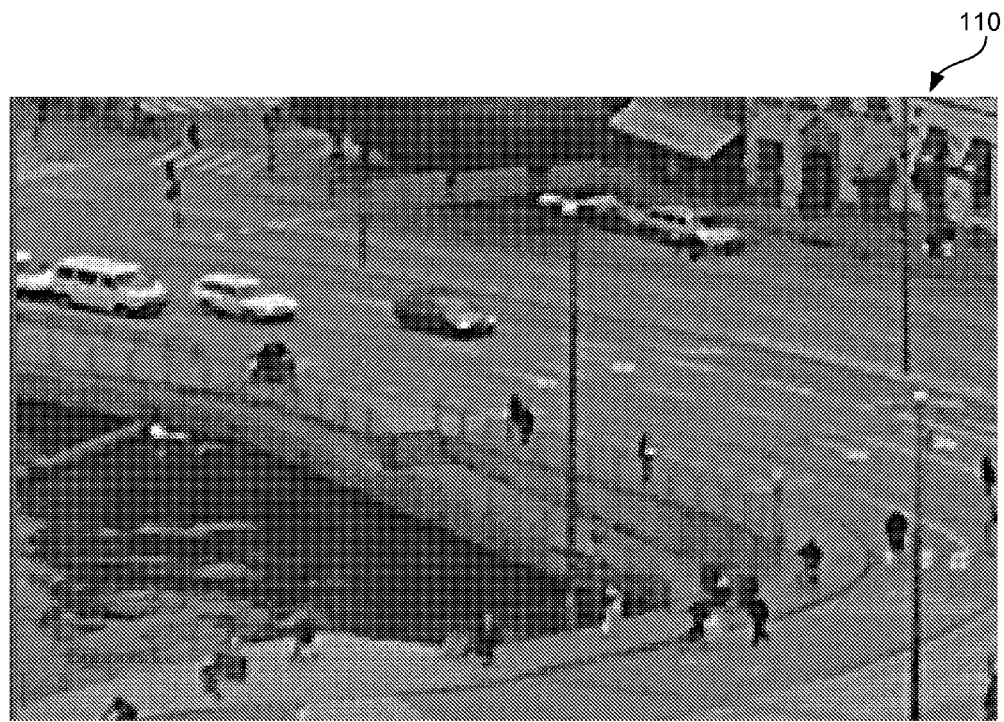
FIG. 8 is an enhanced image resulting from processing, according to embodiments of the present invention, of the exemplary, original decoded image frame shown in FIG. 6, wherein the noise estimate used to control the bi-lateral filter parameter value was based on noise due to sensor, thermal and grain noise and compression noise.

A second exemplary, original, decoded image 90 is depicted in FIG. 6. Here, the image 90 is the result of light compression. Inspection of FIG. 6 shows a significant amount of grain noise, which may become much more visible if enhanced. Shown in FIG. 7 is an enhanced image 100 wherein the noise estimate controlling the parameter selection in the bi-lateral filter considered only the coding noise. As can be seen in FIG. 7, the enhanced image 100 contains amplified grain noise. However, the enhanced image 110 shown in FIG. 8 resulting from image enhancement according to embodiments of the present invention wherein the noise estimate used to select the range sigma parameter for the bi-lateral filter accounted for both the image noise, for example, sensor, thermal, grain and other noise, and the compression noise in an image frame. As can be seen from FIG. 8, the resulting image is enhanced but without amplifying grain noise artifacts.

Embodiments of the present invention described in relation to FIG. 2 comprise codec-noise statistic estimation from the coding parameters. In alternative embodiments described in relation to FIG. 9, the compression noise may be estimated from the decoded image data.

Figure 9:
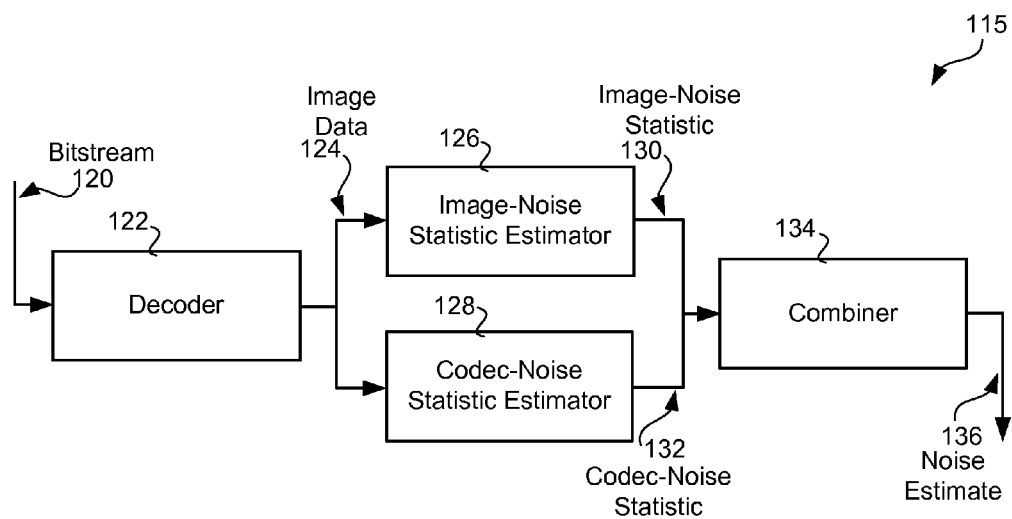
FIG. 9 is a chart showing exemplary embodiments of the present invention comprising estimation of compression noise directly from image data.

In some embodiments of the present invention, described in relation to FIG. 9, comprising a noise-estimation system 115, an input bitstream 120, associated with a still image or a video sequence, may be decoded by a decoder 122. The image data 124 may be made available, from the decoder 122, to an image-noise statistic estimator 126 and to a codec-noise statistic estimator 128. The image-noise statistic estimator 126 may estimate an image-noise statistic 130 associated with the amount of image noise present in the image data 124, and the codec-noise statistic estimator 128 may estimate a codec-noise statistic 132 associated with the compression noise. The image-noise statistic 130 and the codec-noise statistic 132 may be combined by a combiner 134 to produce a final noise estimate 136 associated with the image data. In one embodiment of the present invention, the maximum value of the image-noise statistic 130 and the codec-noise statistic 132 may be assigned to the noise estimate 136. Alternative fusion methods for combining 134 the image-noise statistic 130 and the codec-noise statistic 132 may be used to produce a final noise estimate 136.

The image-noise statistic estimator 126 may analyze the image data 124 to determine the amount of thermal, sensor, grain and other image noise present in the image data 124. Many existing methods are known in the art for estimating the image noise. In an exemplary embodiment of the present invention, the image-noise statistic estimator 126 may identify one, or more, substantially smooth regions in the image data 124 and may calculate the standard deviation of the pixel values within each region. The maximum standard-deviation value may be associated with the image-noise statistic 130.

Figure 10:
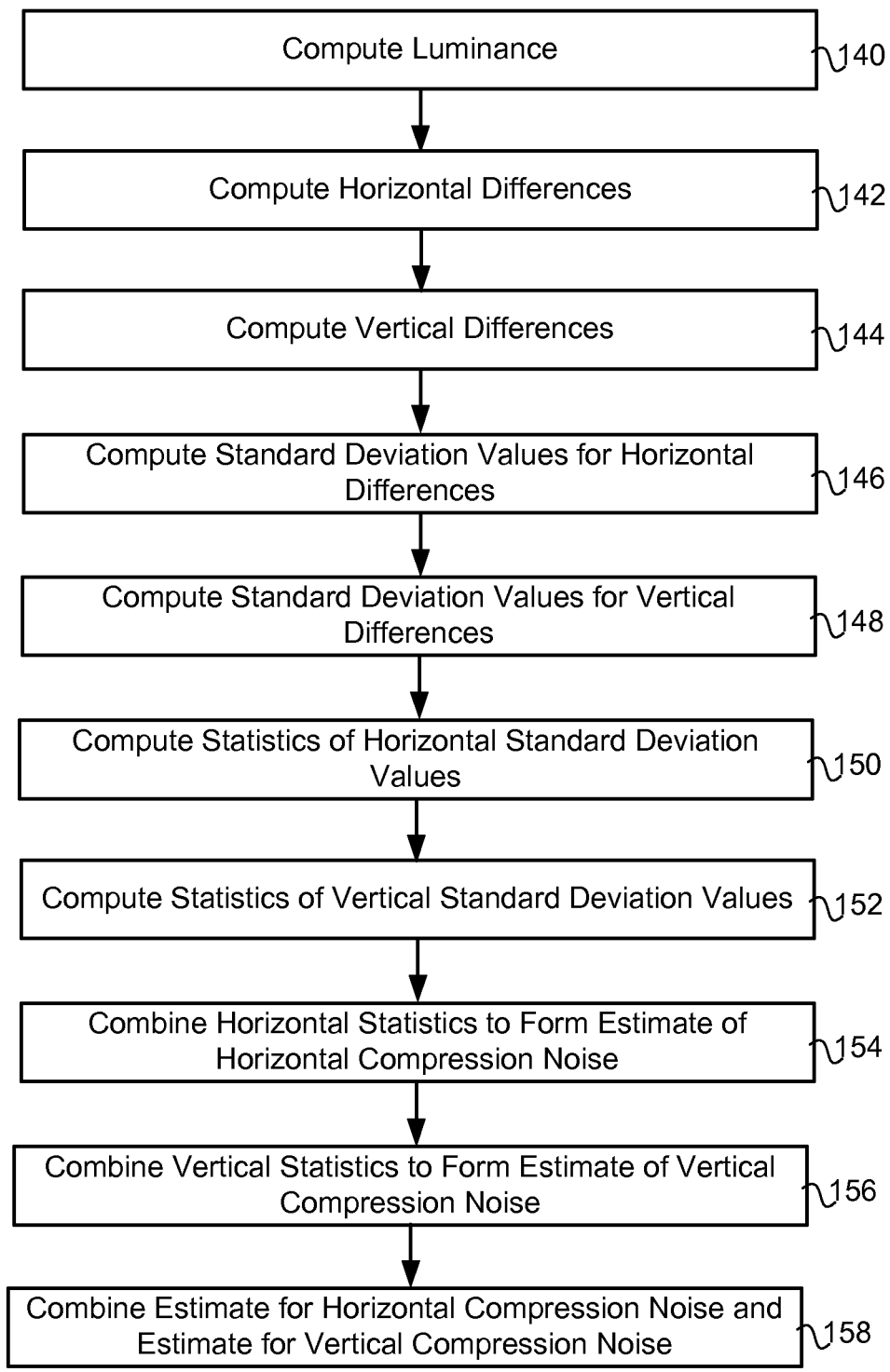
FIG. 10 is a chart showing exemplary embodiments of the present invention comprising estimation of compression noise directly from image data for a still image or a single frame in a video sequence.

In some embodiments of the present invention, the codec-noise statistic estimator 128 may calculate an estimate for the codec noise 132 according to FIG. 10. In these embodiments, a luminance image may be computed 140 from an input RGB (Red Green Blue), or other color space, image. The luminance may be denoted I(x, y), where x and y may denote the horizontal and vertical indices, respectively. A horizontal difference value at each point may be computed 142, thereby producing a plurality of horizontal difference values, and a vertical difference value at each point may be computed 144, thereby producing a plurality of vertical difference values, according to:

$$D_H(x, y) = I(x+1, y) - I(x, y)$$

and $$D_V(x, y) = I(x, y+1) - I(x, y),$$

respectively, where $D_H(x, y)$ may denote a horizontal difference value at pixel location (x, y) and $D_V(x, y)$ may denote a vertical difference value at pixel location (x, y).

The standard deviation of the horizontal differences at a plurality of horizontal offsets may be computed 146, and the standard deviation of the vertical differences at a plurality of vertical offsets may be computed 148. In some embodiments of the present invention, a standard deviation value may be calculated for each offset within a coding block, thereby producing a plurality of horizontal standard deviation values and a plurality of vertical standard deviation values. The number of offsets may be determined by the structure of the image, or video, codec and any processing or scaling of the decoded data that may be performed prior to estimating the compression noise. In an exemplary embodiment comprising the use of eight offsets, the standard deviation values of the horizontal differences may be calculated 146 according to:

$$Mean_H[i] = \sum_{x=0}^{Height} \sum_{y=0}^{Width/8} \frac{D_H(x, 8 \cdot y + i)}{Height \cdot (Width/8)}, i = 0 \ldots 7$$

$$Mean2_H[i] = \sum_{x=0}^{Height} \sum_{y=0}^{Width/8} \frac{D_H(x, 8 \cdot y + i)^2}{Height \cdot (Width/8)}, i = 0 \ldots 7$$

$$STD_H[i] = sqrt(Mean2_H[i] - Mean_H[i]^2), i = 0 \ldots 7.$$

Figure 11:
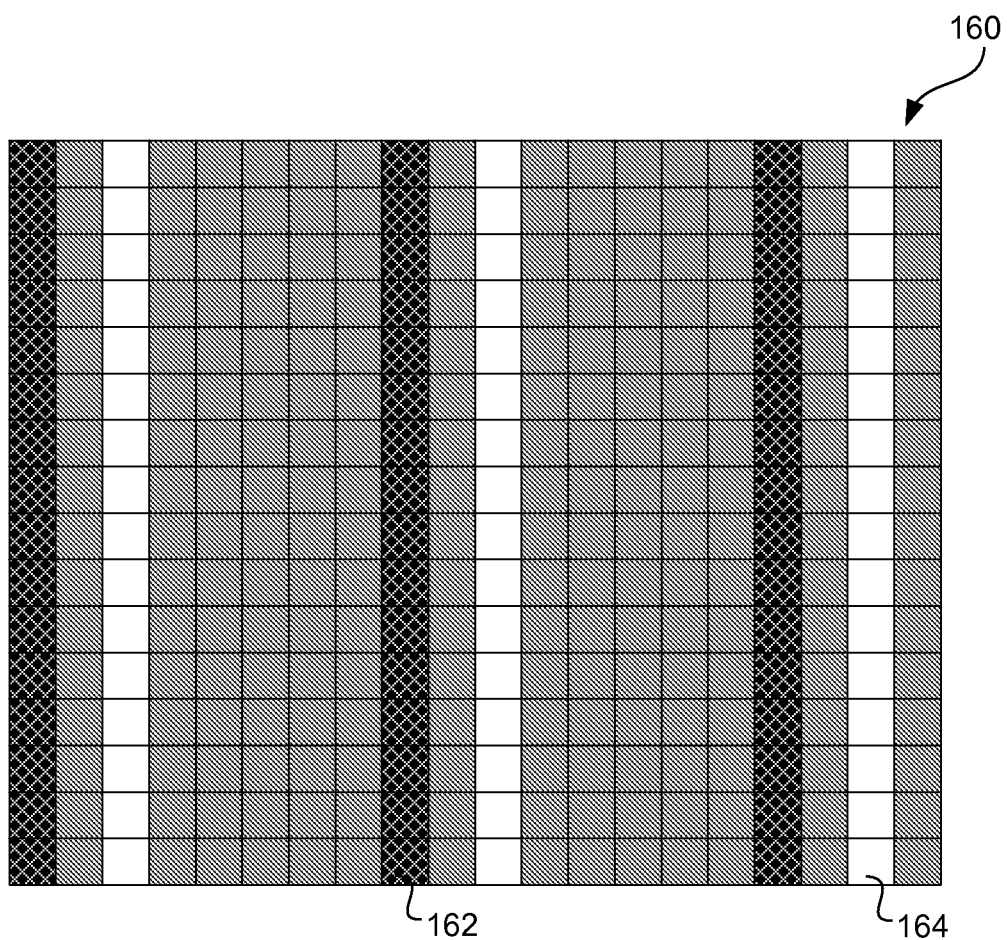
FIG. 11 is a picture illustrating exemplary pixel locations for determination of horizontal differences according to embodiments of the present invention.

FIG. 11 depicts an exemplary portion of an image 160 with pixel locations shown as squares. The pixel locations shown in cross hatch, for example 162, may be the locations used for computing the horizontal standard deviation associated with an offset of zero, $STD_V[0]$, and the pixel locations shown in white, for example 164, may be the locations used for computing the horizontal standard deviation associated with an offset of two, $STD_V[2]$. The standard deviation values of the vertical differences may be similarly calculated 148 according to:

$$Mean_V[i] = \sum_{x=0}^{Height/8} \sum_{y=0}^{Width} \frac{D_V(8 \cdot x + i, y)}{(Height/8) \cdot Width}, i = 0 \ldots 7$$

$$Mean2_V[i] = \sum_{x=0}^{Height/8} \sum_{y=0}^{Width} \frac{D_V(8 \cdot x + i, y)^2}{(Height/8) \cdot Width}, i = 0 \ldots 7$$

$$STD_V[i] = sqrt(Mean2_V[i] - Mean_V[i]^2), i = 0 \ldots 7.$$

Referring again to FIG. 10, statistics may be computed 150 for the horizontal standard deviation values, and statistics may be computed 152 for the vertical standard deviation values. The statistics computed 150 for the horizontal standard deviation values may be referred to as horizontal statistics and the statistics computed 152 for the vertical standard deviation values may be referred to as vertical statistics. In some embodiments of the present invention, the average of the horizontal standard deviation values and the maximum horizontal standard deviation value may be computed 150, and the average of the vertical standard deviation values and the maximum vertical standard deviation value may be computed 152. These values may be computed according to:

$$STD_{H\_MEAN} = \sum_{i=0}^{7} \frac{STD_H[i]}{8}$$

$$STD_{H\_MAX} = max(STD_H[i]), i = 0 \ldots 7$$

$$STD_{V\_MEAN} = \sum_{i=0}^{7} \frac{STD_V[i]}{8}$$

$$STD_{V\_MAX} = max(STD_V[i]), i = 0 \ldots 7,$$

respectively. In alternative embodiments, other statistical values may be calculated, for example, the median, the skew, the kurtosis and other statistical measures.

The computed statistics associated with the horizontal standard deviation values may be combined 154 to form an estimate of the horizontal compression noise. The computed statistics associated with the vertical standard deviation values may be combined 156 to form an estimate of the vertical compression noise. In an exemplary embodiment of the present invention, an estimate of the horizontal compression noise may be calculated according to a weighted average given by:

$$\text{Noise}_{Compression\_H} = 4.64 \cdot \text{STD}_{H\_MAX} - 4.26 \cdot \text{STD}_{H\_MEAN} + 0.58,$$

and an estimate of the vertical compression noise may be calculated according to a weighted average given by:

$$\text{Noise}_{Compression\_V} = 4.64 \cdot \text{STD}_{V\_MAX} - 4.26 \cdot \text{STD}_{V\_MEAN} + 0.58,$$

where the values 4.64, 4.26 and 0.58 are exemplary weighting parameters. In alternative embodiments, other weighting values may be used.

The estimate for the horizontal compression noise and the estimate for the vertical compression noise may be combined 158 to form a single compression noise estimate. Any data fusion method known in the art may be used to combine the estimate for the horizontal compression noise and the estimate for the vertical compression noise. In some embodiments of the present invention, the compression-noise estimate may be determined according to:

$$\text{Noise}_{Compression} = \max(\text{Noise}_{Compression\_H}, \text{Noise}_{Compression\_V}).$$

Figure 12:
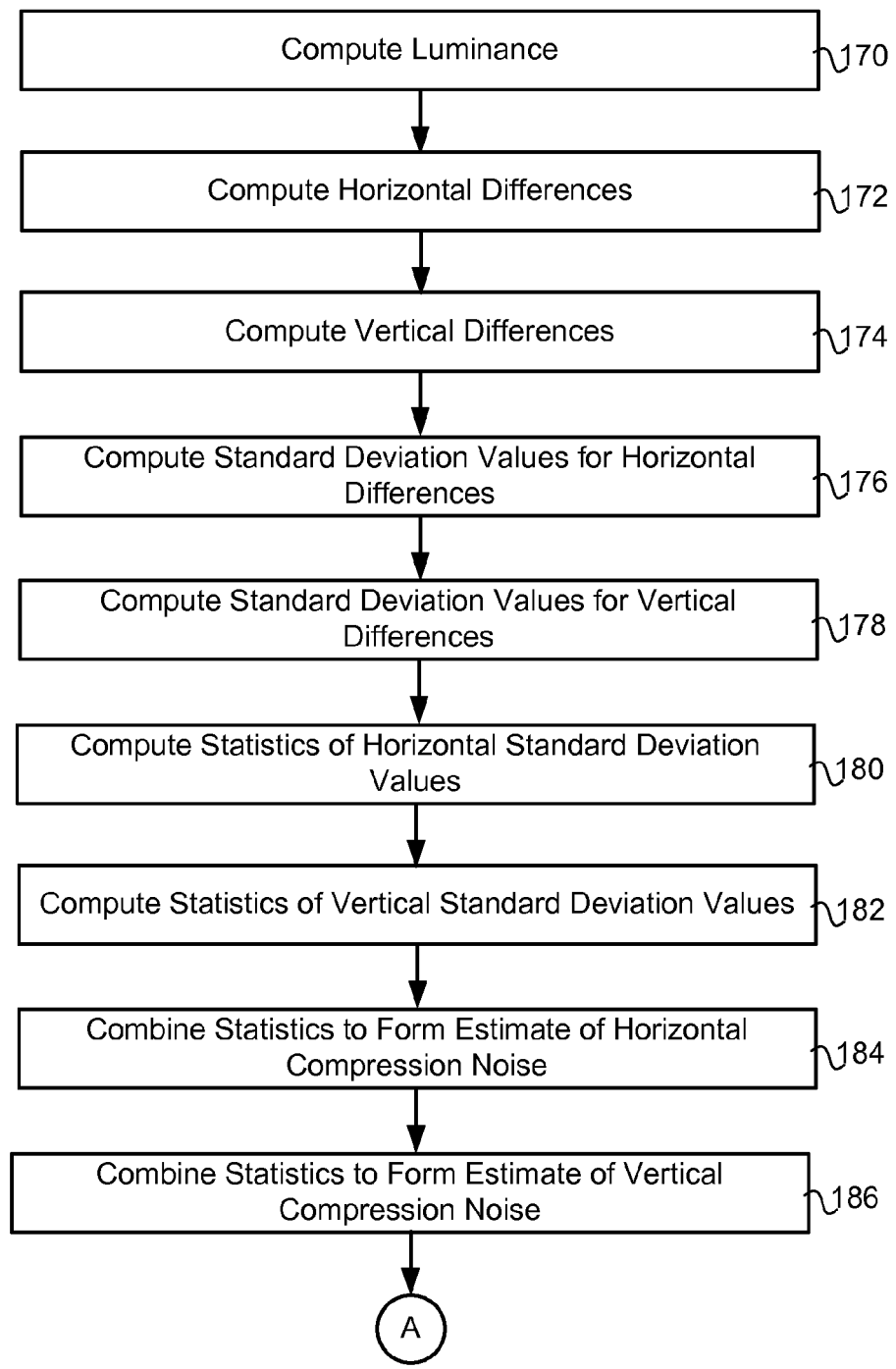
FIG. 12 is a chart showing exemplary embodiments of the present invention comprising estimation of compression noise directly from image data for a frame in a video sequence.
Figure 12:
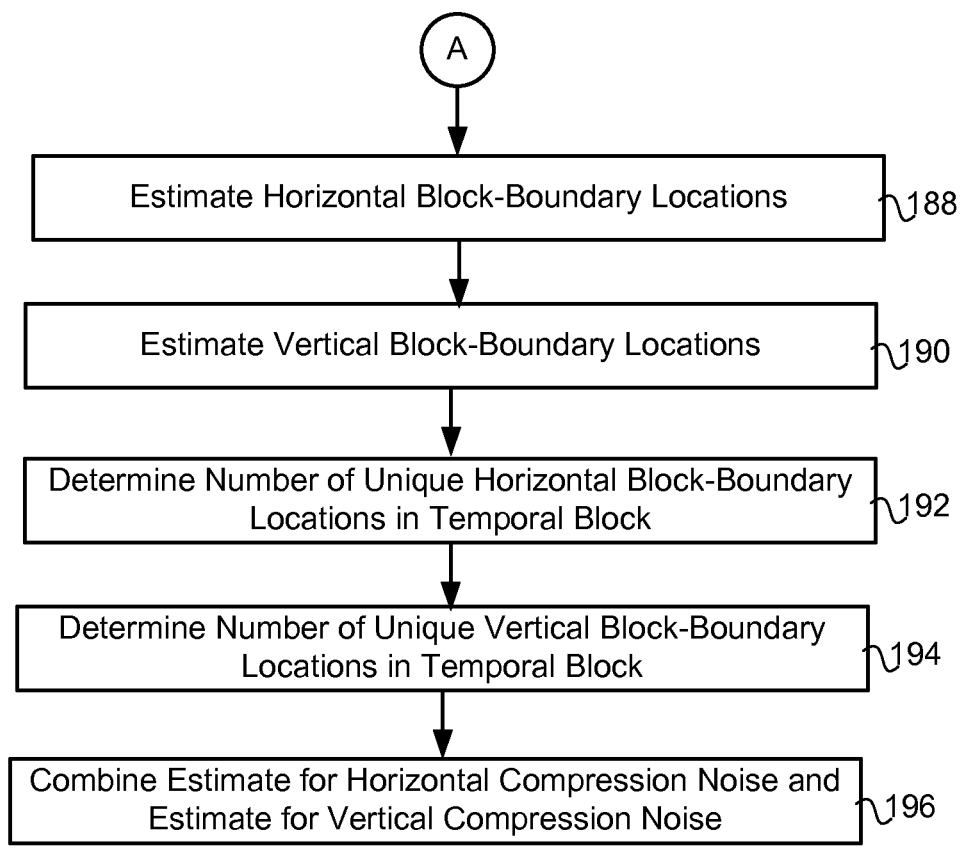

In alternative embodiments of the present invention, the codec-noise statistic estimator 128 may calculate an estimate for the codec noise 132 according to FIG. 12. In these embodiments, the input image may be a frame in a video sequence, and past frames may be considered in determining the noise estimate. In these embodiments, a luminance image may be computed 170 from an input RGB, or other color space, image, and the luminance may be denoted I(x, y), where x and y may denote the horizontal and vertical indices, respectively. A horizontal difference value at each point may be computed 172, thereby producing a plurality of horizontal difference values, and a vertical difference value at each point may be computed 174, thereby producing a plurality of vertical difference values, according to:

$$D_H(x, y) = I(x+1, y) - I(x, y)$$

and $$D_V(x, y) = I(x, y+1) - I(x, y),$$

respectively, where $D_H(x, y)$ may denote a horizontal difference value at pixel location (x, y) and $D_V(x, y)$ may denote a vertical difference value at pixel location (x, y).

The standard deviation of the horizontal differences at a plurality of horizontal offsets may be computed 176, and the standard deviation of the vertical differences at a plurality of vertical offsets may be computed 178. In some embodiments of the present invention, a standard deviation value may be calculated for each offset within a coding block, thereby producing a plurality of horizontal standard deviation values and a plurality of vertical standard deviation values. The number of offsets may be determined by the structure of the video codec and any processing or scaling of the decoded data that may be performed prior to estimating the compression noise. In an exemplary embodiment comprising the use of eight offsets, the standard deviation values of the horizontal differences may be calculated 176 according to:

$$\text{Mean}_H[i] = \sum_{x=0}^{Height} \sum_{y=0}^{Width/8} \frac{D_H(x, 8 \cdot y + i)}{\text{Height} \cdot (\text{Width}/8)}, i = 0 \ldots 7$$

$$\text{Mean2}_H[i] = \sum_{x=0}^{Height} \sum_{y=0}^{Width/8} \frac{D_H(x, 8 \cdot y + i)^2}{\text{Height} \cdot (\text{Width}/8)}, i = 0 \ldots 7$$

$$\text{STD}_H[i] = \text{sqrt}(\text{Mean2}_H[i] - \text{Mean}_H[i]^2), i = 0 \ldots 7.$$

The standard deviation values of the vertical differences may be similarly calculated 178 according to:

$$\text{Mean}_V[i] = \sum_{x=0}^{Height/8} \sum_{y=0}^{Width} \frac{D_V(8 \cdot x + i, y)}{(\text{Height}/8) \cdot \text{Width}}, i = 0 \ldots 7$$

$$\text{Mean2}_V[i] = \sum_{x=0}^{Height/8} \sum_{y=0}^{Width} \frac{D_V(8 \cdot x + i, y)^2}{(\text{Height}/8) \cdot \text{Width}}, i = 0 \ldots 7$$

$$\text{STD}_V[i] = \text{sqrt}(\text{Mean2}_V[i] - \text{Mean}_V[i]^2), i = 0 \ldots 7.$$

Statistics may be computed 180 for the horizontal standard deviation values, and statistics may be computed 182 for the vertical standard deviation values. In some embodiments of the present invention, the average of the horizontal standard deviation values and the maximum horizontal standard deviation value may be computed 180, and the average of the vertical standard deviation values and the maximum vertical standard deviation value may be computed 182. These values may be computed according to:

$$\text{STD}_{H\_MEAN} = \sum_{i=0}^{7} \frac{\text{STD}_H[i]}{8}$$

$$\text{STD}_{H\_MAX} = \max(\text{STD}_H[i]), i = 0 \ldots 7$$

$$\text{STD}_{V\_MEAN} = \sum_{i=0}^{7} \frac{\text{STD}_V[i]}{8}$$

$$\text{STD}_{V\_MAX} = \max(\text{STD}_V[i]), i = 0 \ldots 7,$$

respectively. In alternative embodiments, other statistical values may be calculated, for example, the median, the skew, the kurtosis and other statistical measures.

The computed statistics associated with the horizontal standard deviation values may be combined 184 to form an estimate of the horizontal compression noise. The computed statistics associated with the vertical standard deviation values may be combined 186 to form an estimate of the vertical compression noise. In an exemplary embodiment of the present invention, an estimate of the horizontal compression noise may be calculated according to a weighted average given by:

$$\text{Noise}_{Compression\_H} = 4.64 \cdot \text{STD}_{H\_MAX} - 4.26 \cdot \text{STD}_{H\_MEAN} + 0.58,$$

and an estimate of the vertical compression noise may be calculated according to a weighted average given by:

$$\text{Noise}_{Compression\_V} = 4.64 \cdot \text{STD}_{V\_MAX} 4.26 \cdot \text{STD}_{G\_MEAN} + 0.58,$$

where the values 4.64, 4.26 and 0.58 are exemplary weighting parameters. In alternative embodiments, other weighting values may be used.

The location of block boundaries in the current image frame may be estimated 188, 190 using the statistics previously computed. In an exemplary embodiment, a horizontal-block boundary location may be estimated 188 using the maximum horizontal standard deviation value according to:

$$\text{Block}_H[\text{frame\_num}]=i, \text{ where } \text{STD}_{H\_MAX}=\text{STD}_H[i],$$

where frame_num may denote a time index associated with the current frame. A vertical block-boundary location may be estimated 190 by the maximum vertical standard deviation value according to:

$$\text{Block}_V[\text{frame\_num}]=i, \text{ where } \text{STD}_{V\_MAX}=\text{STD}_V[i],$$

where frame_num may denote a time index associated with the current frame.

The number of unique horizontal block-boundary locations and the number of unique vertical block-boundary locations in a temporal block may be determined 192, 194 by counting the number of unique values for $\text{Block}_H[i]$ and $\text{Block}_V[i]$, respectively, where i is an index with values from frame_num to frame_num-N and N is a constant. If the number of unique values for the horizontal direction is above a threshold, then the estimate for the horizontal compression noise may be set equal to zero, and if the number of unique values for the vertical direction is above a threshold, then the estimate for the vertical compression noise may be set equal to zero.

The estimate for the horizontal compression noise and the estimate for the vertical compression noise may be combined 196 to form a single compression noise estimate. Any data fusion method known in the art may be used to combine the estimate for the horizontal compression noise and the estimate for the vertical compression noise. In some embodiments of the present invention, the compression-noise estimate may be determined according to:

$$\text{Noise}_{Compression}=\max(\text{Noise}_{Compression\_H}, \text{Noise}_{Compression\_V}).$$

Figure 13:
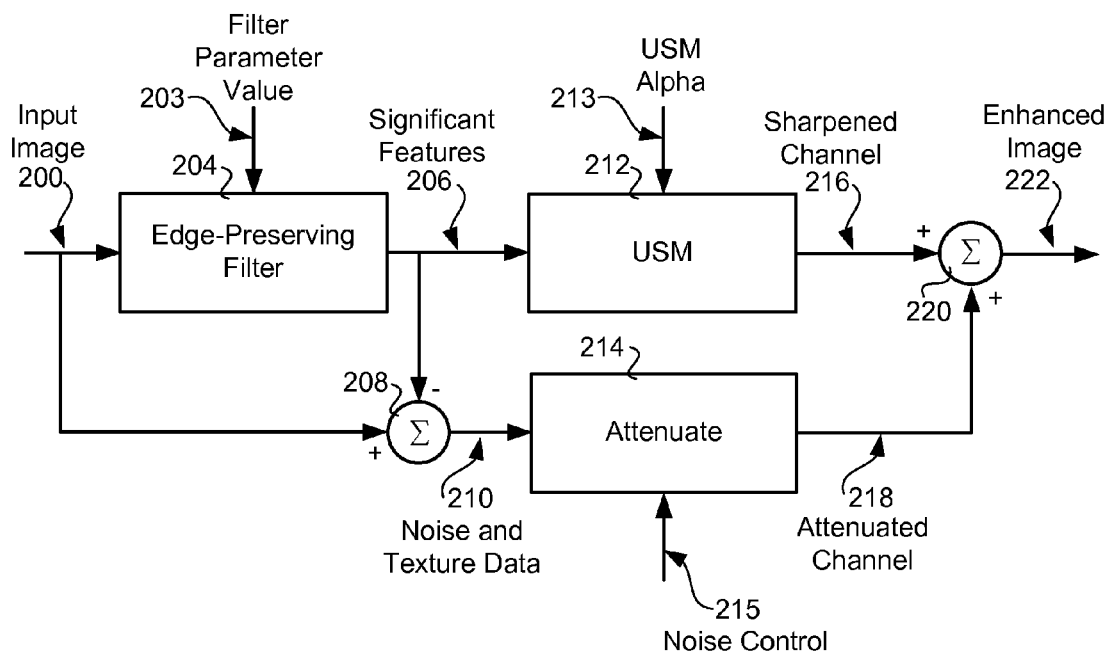
FIG. 13 is chart showing exemplary embodiments of the present invention comprising un-sharp masking.

In some embodiments of the present invention, the parameters of an edge-preserving filter may be adjusted based on a sharpening value used in a sharpening filter. In some exemplary embodiments, the edge-preserving filter may comprise a bi-lateral filter. In exemplary embodiments of the present invention shown in FIG. 13 and FIG. 14, an edge-preserving filter 204 may be used to separate an input image 200 into two channels: a first channel 206 which may comprise image content to be sharpened by un-sharp masking (USM) 212; and a second channel 210 which may comprise image content to attenuate. The level of sharpening associated with the un-sharp masking 212 may be controlled by the value of the USM alpha 213 set for the USM filter 212. In these embodiments, a filter parameter value 203 of the edge-preserving filter 204 may control the assignment of input-image content to the first channel 206 and the second channel 210. In some embodiments of the present invention wherein the edge-preserving filter comprises a bi-lateral filter, the filter parameter value may be the range sigma parameter value associated with the bi-lateral filter.

In some embodiments, in order to maximize the amount of sharpening, the filter parameter 203 may be set based on the noise statistics associated with the input image 200, and additionally, in order to mitigate noise amplification due to sharpening, the filter parameter 203 may be set based on the sharpening value 213 used in the sharpening filter 212.

An input image 200 and a filter parameter value 203 associated with the input image may be made available to an edge-preserving filter 204. The edge-preserving filter 204 may be used to divide the input image 200 into two channels 206, 210. The first channel 206 may correspond to significant features in the input image 200, and the second channel 210, formed by removing 208 the first channel 206 from the input image 200, may contain the residual difference between the first channel 206 and the input image 200. The residual difference 210 may comprise noise and texture data. The first channel 206 may be sharpened using un-sharp masking 212, and the second channel 210 may be attenuated 214 in accordance with noise control 215. The sharpened channel 216 and the attenuated channel 218 may be combined 220 to form an enhanced image 222. The filter parameter value 203 of the edge-preserving filter 204 may control the assignment of input-image content to the first channel 206 and the second channel 210. In some embodiments of the present invention (not shown), the enhanced image 222 may be up-sampled to a resolution greater than that of the input image 200.

Figure 14:
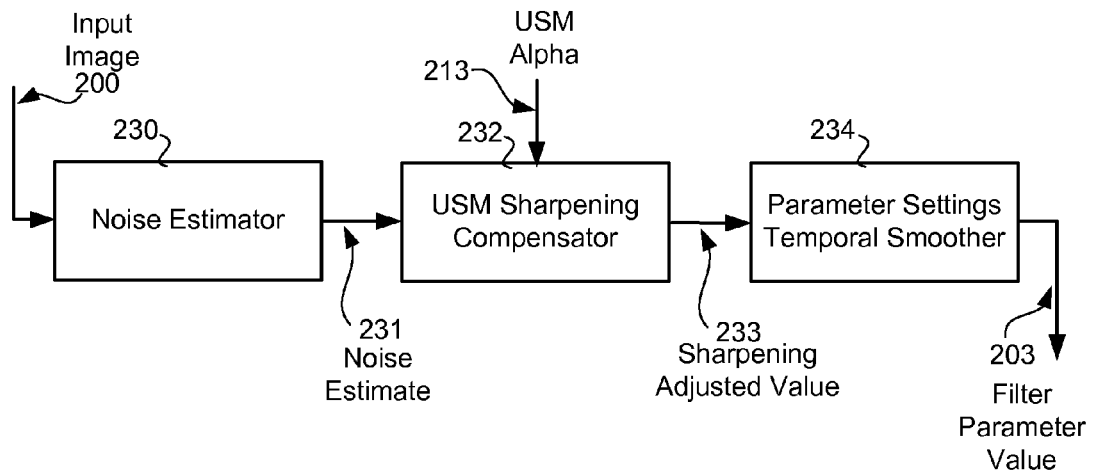
FIG. 14 is a chart showing exemplary embodiments of the present invention comprising edge-preserving filter parameter value determination based on the level of sharpening associated with the un-sharp masking.

Referring to FIG. 14, the input image 200 may be received by a noise estimator 230 which may generate a noise estimate 231 based on an estimate of the image noise and the codec noise present in the input image 200. The noise estimate 231 may be determined according to the previously described embodiments of the present invention. The noise estimate 231 may be adjusted by a USM sharpening compensator 232 to account for the sharpening value, and the resulting sharpening-adjusted value 233 may be temporally filtered 234 to reduce noise in the control process. The output of the temporal filter 234 may be the filter parameter value 203 provided to the edge-preserving filter 204.

Figure 15:
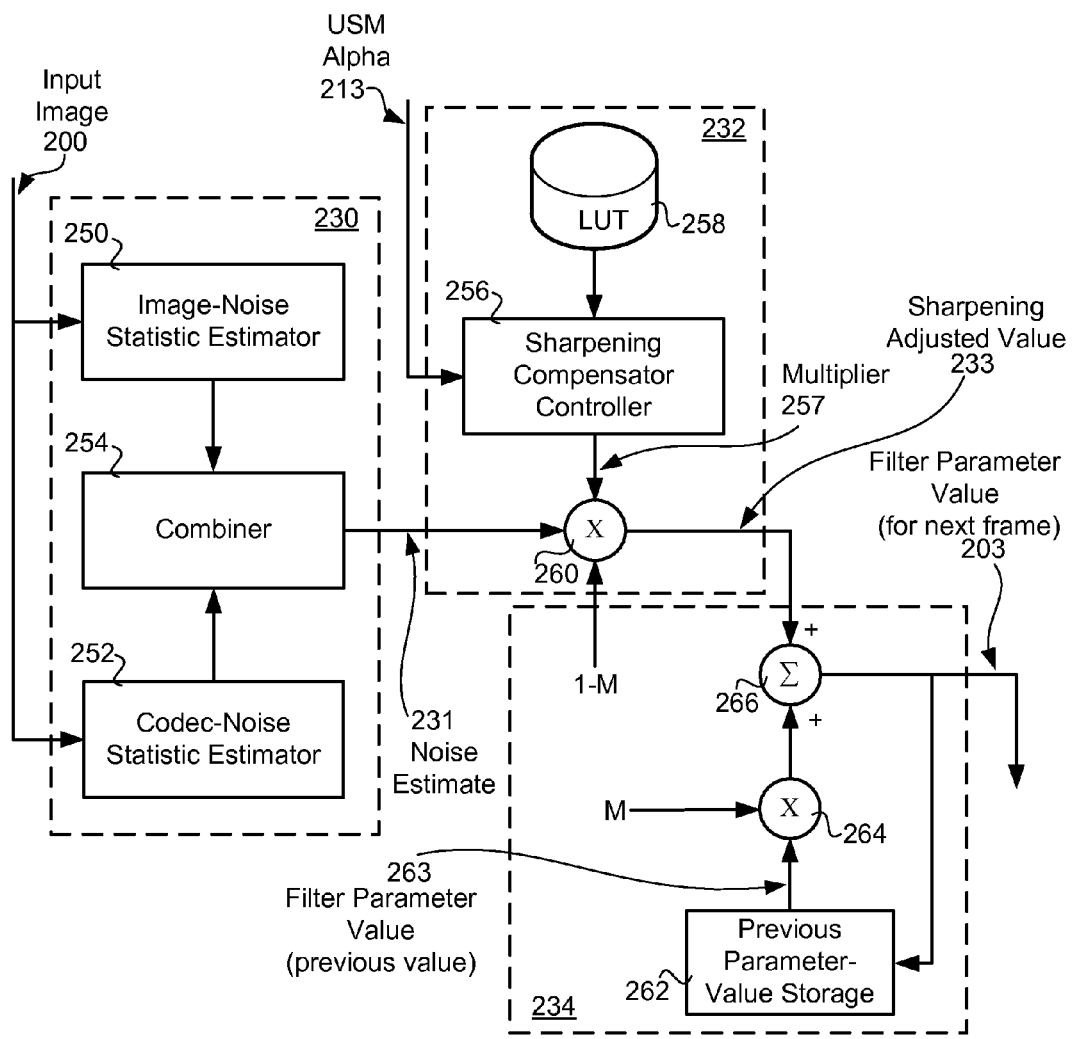
FIG. 15 is a chart showing exemplary embodiments of the present invention comprising edge-preserving filter parameter value determination based on the level of sharpening associated with the un-sharp masking and based on temporal smoothing.

In some embodiments of the present invention described in relation to FIG. 14 and FIG. 15, the noise estimator 230 may comprise an image-noise statistic estimator 250 and a codec-noise statistic estimator 252 for estimating image noise and codec noise associated with an input image 200, respectively. The noise estimator 230 may comprise a combiner 254 for combining the image noise estimated by the image-noise statistic estimator 250 and the codec noise codec-noise statistic estimator 252. The noise estimate 231 may be provided to the USM sharpening compensator 232. In some embodiments, the noise estimate 231 may be converted to a standard deviation value in the noise estimator 230. In alternative embodiments, the noise estimate may be converted to a standard deviation value in the USM sharpening compensator 232.

Figure 16:
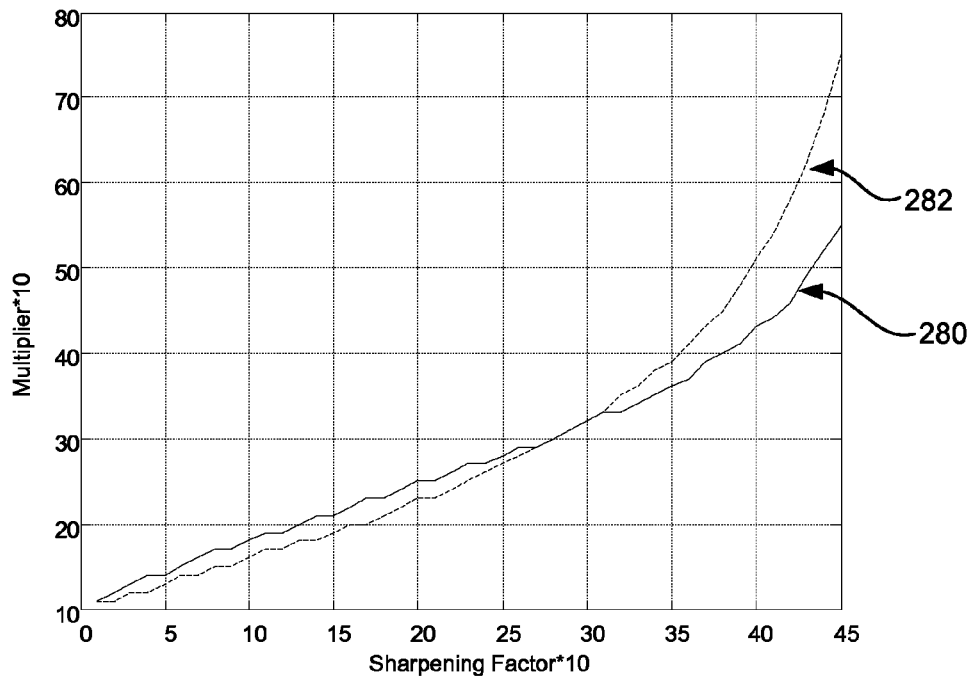
FIG. 16 is a plot showing two exemplary look-up tables for associating a sharpening factor with a multiplier.

The USM sharpening compensator 232 may adjust the noise estimate 231 by a value associated with the level of sharpening 213. In some embodiments of the present invention, a sharpening compensator controller 256 may use the USM alpha value 213 as an index into a look-up table 258 to determine a multiplier 257 which may be used to multiplicatively adjust 260 the standard-deviation-value noise estimate 231. FIG. 16 depicts two plots 280, 282 each associated with an exemplary look-up table derived to maintain a constant noise level with increasing sharpening factor.

In addition to adjusting the noise estimate 231 by the value 257 associated with the level of sharpening 213, the noise estimate 231 may be multiplicatively 260 adjusted by a value associated with control parameter, which may be denoted M, that controls how quickly the estimated parameter values may change as a function of time. In some embodiments the multiplicative adjustment 260 may be 1-M. In some embodiments of the present invention, a smaller value for M may correspond to a faster change, while a larger value for M may correspond to a slower change. In some embodiments of the present invention, M may be set to 0.5. A filter parameter value 263 associated with a previous frame may be retrieved from storage 262 and multiplied 264 by the control parameter M. The results of the two multiplications 260, 264 may be added 266 to form the edge-preserving filter parameter 203 for the next frame.

Figure 17:
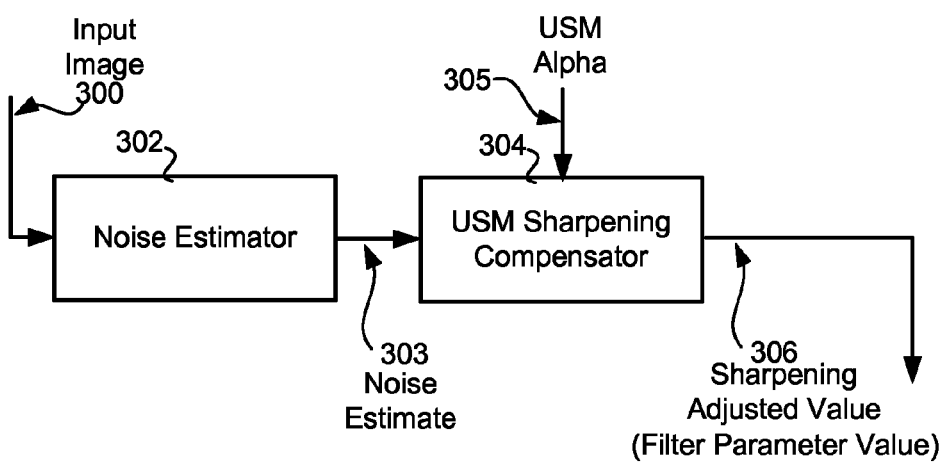
FIG. 17 is a chart showing exemplary embodiments of the present invention comprising edge-preserving filter parameter value determination based on the level of sharpening associated with the un-sharp masking.

In alternative embodiments described in relation to FIG. 17, an edge-preserving filter parameter may be determined for filtering of a still image, or a video frame. An input image 300 may be received by a noise estimator 302 which may generate a noise estimate 303 based on an estimate of the image noise and the codec noise present in the input image 300. The noise estimate 303 may be determined according to the previously described embodiments of the present invention. The noise estimate 303 may be adjusted by a USM sharpening compensator 304 to account for the sharpening value 305, and the resulting sharpening-adjusted value 306 may be the filter parameter value 306 provided to the edge-preserving filter 204.

Figure 18:
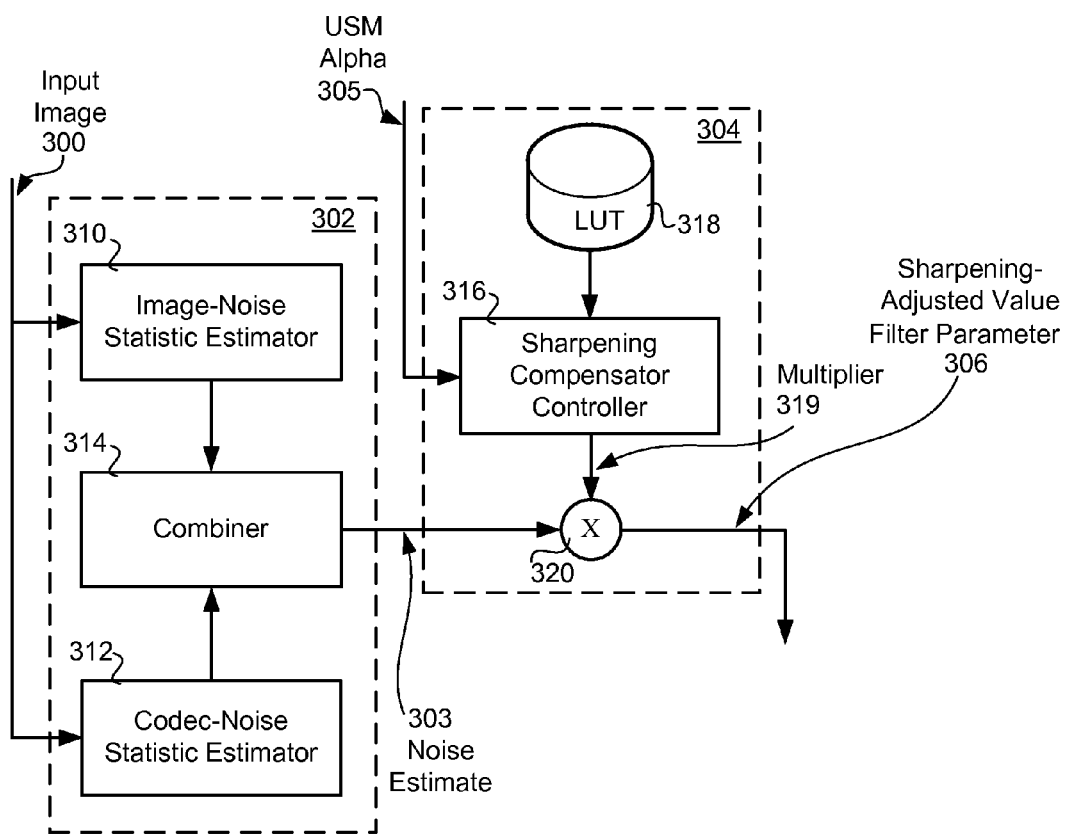
FIG. 18 is a chart showing an exemplary embodiment of the present invention comprising edge-preserving filter parameter value determination based on the level of sharpening associated with the un-sharp masking.

In some embodiments of the present invention described in relation to FIG. 17 and FIG. 18, the noise estimator 302 may comprise an image-noise statistic estimator 310 and a codec-noise statistic estimator 312 for estimating image noise and codec noise associated with an input image 300, respectively. The noise estimator 302 may comprise a combiner 314 for combining the image noise estimated by the image-noise statistic estimator 310 and the codec noise codec-noise statistic estimator 312. The noise estimate 303 may be provided to the USM sharpening compensator 304. In some embodiments, the noise estimate 303 may be converted to a standard deviation value in the noise estimator 302. In alternative embodiments, the noise estimate 303 may be converted to a standard deviation value in the USM sharpening compensator 304.

The USM sharpening compensator 304 may adjust the noise estimate 303 by a value associated with the level of sharpening 305. In some embodiments of the present invention, a sharpening compensator controller 316 may use the USM alpha value 305 as an index into a look-up table 318 to determine a multiplier 319 which may be used to multiplicatively adjust 320 the standard-deviation-value noise estimate 303 to produce a sharpening-adjusted edge-preserving filter parameter value 306. FIG. 16 depicts two plots 280, 282 each associated with an exemplary look-up table derived to maintain a constant noise level with increasing sharpening factor.

Figure 19:
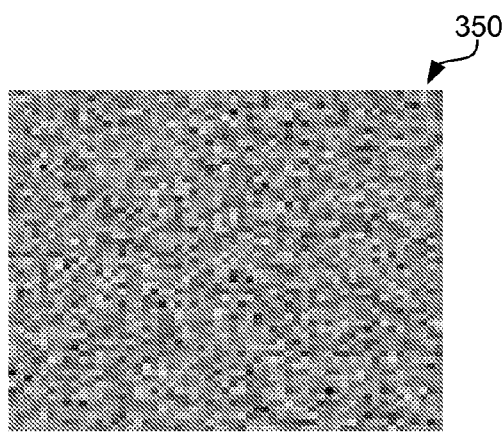
FIG. 19 is an exemplary, original noise image.
Figure 20:
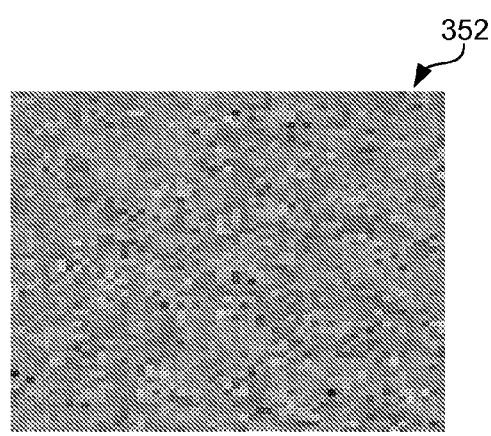
FIG. 20 shows a result of bi-lateral filtering, using a sigma range parameter value equal to the standard deviation of the noise, of the original noise image shown in FIG. 19.
Figure 21:
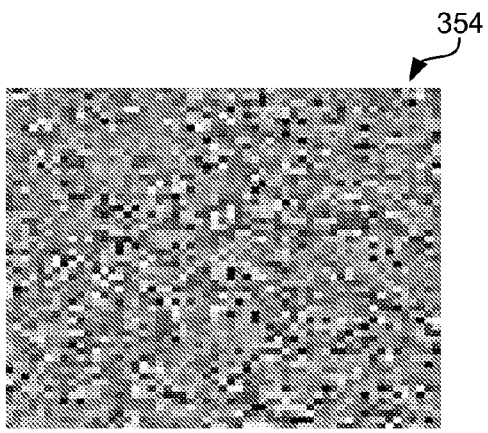
FIG. 21 shows a result of bi-lateral filtering, according to embodiments of the present invention, of the original noise image shown in FIG. 19, where the bi-lateral filter parameter value was set based on the noise in the original noise image.
Figure 22:
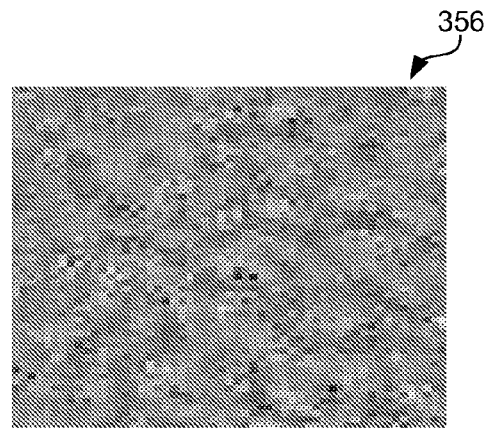
FIG. 22 shows a result of bi-lateral filtering, according to embodiments of the present invention, of the original noise image shown in FIG. 19, where the bi-lateral filter parameter value was set based on the noise in the original noise image and the level of sharpening.

The effectiveness of embodiments of the present invention may be illustrated in FIGS. 19-25. FIG. 19 depicts an exemplary, original, synthetic noise target 350. FIG. 20 shows the result 352 of bi-lateral filtering, using a sigma range parameter value equal to the standard deviation of the noise, of the original image 250 shown in FIG. 19. An enhanced image 354 is shown in FIG. 21. This enhanced image 354 exhibits significant amplification of the image noise. FIG. 22 depicts an enhanced image 356 enhanced according to embodiments of the present invention in which the bi-lateral filter sigma range parameter is set according to the noise statistics of the image in addition to accounting for the sharpening strength of the sharpening filter. The noise in FIG. 22 is similar to the noise in FIG. 20, but the degree of enhancement is different.

A second exemplary, original image 360 is depicted in FIG. 23. A superimposed, white circle 361 is shown on the image 360 in a region wherein the noise in the image 360 is visible. FIG. 24 depicts an image 362 which results from bi-lateral filtering according to embodiments of the present invention with a range sigma parameter that has been set accounting for the noise, but not the sharpening process. Inspection of the region inside the overlaid white circle 363 shows that the noise is amplified relative to the input image 360. FIG. 25 depicts an image 364 which results from bi-lateral filtering according to embodiments of the present invention with a range sigma parameter that has been set accounting for both noise and the sharpening process. Inspection of the region inside the overlaid white circle 365 shows that the noise is not amplified relative to the original image 360, but the desired increase in sharpening of image content is visible.

Some embodiments of the present invention described herein comprise an edge-preserving filter. In some embodiments, the edge-preserving filter may comprise a bi-lateral filter. A person of ordinary skill in the art will recognize the existence of many edge-preserving filters and many forms of bi-lateral filters.

Although the charts and diagrams in FIGS. 1, 2, 9, 10, 12-15, 17 and 18 may show a specific order of execution, it is understood that the order of execution may differ from that which is depicted. For example, the order of execution of the blocks may be changed relative to the shown order. Also, as a further example, two or more blocks shown in succession in the figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A system for enhancing an input image, said system comprising:
   an edge-preserving filter for generating, from an input image, a first image comprising image content, from said input image, to sharpen and a second image comprising image content, from said input image, to attenuate;
   a noise estimator for determining a noise estimate associated with said input image, wherein said noise estimator comprises:
      an image-noise statistic estimator for estimating at least one of grain noise, sensor noise and thermal noise in said input image, thereby producing an image-noise statistic;
      a codec-noise statistic estimator for estimating compression noise in said input image, thereby producing a codec-noise statistic;

a combiner for combining said image-noise statistic and said codec-noise statistic; and wherein said noise estimate is based on said combined said image-noise statistic and said codec-noise statistic; and wherein a parameter value associated with said edge-preserving filter is based on said noise estimate.

2. The system as described in claim 1, wherein said edge-preserving filter comprises a bi-lateral filter.

3. The system as described in claim 1, wherein said parameter value associated with said edge-preserving filter is proportional to said noise estimate.

4. The system as described in claim 1, wherein said parameter value is a range sigma value.

5. The system as described in claim 4, wherein said range sigma value is proportional to said noise estimate.

6. The system as described in claim 1, wherein said combiner comprises selecting the maximum value of said image-noise statistic and said codec-noise statistic for said combined said image-noise statistic and said codec-noise statistic.

7. The system as described in claim 1, wherein said codec-noise statistic estimator estimates said codec noise statistic from said input image.

8. The system as described in claim 1, wherein said codec-noise statistic estimator estimates said codec-noise statistic from coding parameters associated with said input image.

9. The system as described in claim 8, wherein said codec-noise statistic estimator comprises a plurality of look-up tables, wherein each look-up table in said plurality of look-up tables is associated with a codec and at least one codec coding parameter.

10. The system as described in claim 1 further comprising a decoder for decoding a bitstream associated with said input image.

11. The system as described in claim 1 further comprising:
a sharpener for sharpening said first image;
an attenuator for attenuating said second image; and
an image combiner for combining said sharpened first image and said attenuated second image.

12. The system as described in claim 11 further comprising an up-sampler for up-sampling said combined image.

13. The system as described in claim 11, wherein said sharpener comprises an un-sharp masking filter.

14. The system as described in claim 11 further comprising a sharpening compensator for compensating said combined said image-noise statistic and said codec-noise statistic to account for a level of sharpening associated with said sharpener, and wherein said parameter value associated with said edge-preserving filter is based on said compensated, combined said image-noise statistic and said codec-noise statistic.

15. The system as described in claim 14, wherein:
said sharpener comprises an un-sharp masking filter; and
said compensating said combined said image-noise statistic and said codec-noise statistic to account for a level of sharpening associated with said sharpener is based on an un-sharp masking alpha parameter value.

16. The system as described in claim 15, wherein said compensating said combined said image-noise statistic and said codec-noise statistic to account for said level of sharpening associated with said sharpener comprises accessing a sharpener look-up table using said un-sharp masking alpha parameter value as an index.

17. The system as described in claim 14 further comprising a temporal filter for combining said compensated, combined said image-noise statistic and said codec-noise statistic with a previous parameter value associated with said edge-preserving filter.

18. A system for enhancing an input image, said system comprising:
an edge-preserving filter for generating, from an input image, a first image comprising image content, from said input image, to sharpen and a second image comprising image content, from said input image, to attenuate;
a noise estimator for determining a noise estimate associated with said input image, wherein said noise estimate is based on a combination of an image-noise statistic and a codec-noise statistic;
a sharpener for sharpening said first image;
an attenuator for attenuating said second image;
a combiner for combining said sharpened first image and said attenuated second image;
a sharpening compensator for compensating said combination of said image-noise statistic and said codec-noise statistic to account for a level of sharpening associated with said sharpener; and
wherein a parameter value associated with said edge-preserving filter is based on said compensated combination of said image-noise statistic and said codec-noise statistic.

19. The system as described in claim 18, wherein said sharpener comprises an un-sharp masking filter.

20. The system as described in claim 18 further comprising an up-sampler for up-sampling said combined said sharpened first image and said attenuated second image.

21. The system as described in claim 18, wherein:
said sharpener comprises an un-sharp masking filter; and
said compensating said combination of said image-noise statistic and said codec-noise statistic to account for a level of sharpening associated with said sharpener is based on an un-sharp masking alpha parameter value.

22. The system as described in claim 21, wherein said compensating said combination of said image-noise statistic and said codec-noise statistic to account for said level of sharpening associated with said sharpener comprises accessing a sharpener look-up table using said un-sharp masking alpha parameter value as an index.

23. The system as described in claim 18 further comprising a temporal filter for combining said compensated combination of said image-noise statistic and said codec-noise statistic with a previous parameter value associated with said edge-preserving filter.

* * * * *